(12) United States Patent
Yuan et al.

(10) Patent No.: US 11,018,973 B2
(45) Date of Patent: May 25, 2021

(54) DISTRIBUTED SONIC FABRIC CHASSIS

(71) Applicant: Microsoft Technology Licensing, LLC, Redmond, WA (US)

(72) Inventors: Lihua Yuan, Bellevue, WA (US); Guohan Lu, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 11 days.

(21) Appl. No.: 16/428,176

(22) Filed: May 31, 2019

(65) Prior Publication Data
US 2020/0382419 A1 Dec. 3, 2020

(51) Int. Cl.
*H04L 12/715* (2013.01)
*H04L 12/741* (2013.01)
*H04L 12/935* (2013.01)
*H04L 12/931* (2013.01)
*H04L 12/721* (2013.01)

(52) U.S. Cl.
CPC .......... *H04L 45/64* (2013.01); *H04L 45/745* (2013.01); *H04L 49/30* (2013.01); *H04L 49/354* (2013.01); *H04L 49/40* (2013.01); *H04L 49/45* (2013.01); *H04L 45/66* (2013.01)

(58) Field of Classification Search
CPC ......... H04L 45/64; H04L 49/40; H04L 49/45; H04L 45/745; H04L 49/30; H04L 49/354; H04L 45/66; H04L 41/20; H04L 49/25; H04L 45/38; H04L 47/24; H04L 45/306; H04L 67/00; H04L 63/0892; H04L 63/10; H04L 69/18
See application file for complete search history.

(56) References Cited

U.S. PATENT DOCUMENTS

| | | | |
|---|---|---|---|
| 6,785,843 B1 * | 8/2004 | McRae | H04L 45/00 714/23 |
| 6,985,493 B1 * | 1/2006 | Roumas | H04L 45/60 370/392 |
| 6,999,454 B1 | 2/2006 | Crump | |
| 7,039,073 B1 | 5/2006 | Muntz et al. | |

(Continued)

OTHER PUBLICATIONS

CISCO. Catalyst 9400 Series Architecture. White Paper. (Year: 2019).*

(Continued)

*Primary Examiner* — Andre Tacdiran
(74) *Attorney, Agent, or Firm* — Mark K. Young; Mayer & Williams, PC

(57) ABSTRACT

SONiC (Software for Open Networking in the Cloud) is instantiated in a chassis-based networking switch device to enable control plane functionality for the line cards and backplane. The SONiC platform may be configured with a routing table and BGP (border gateway protocol) to provide routing capabilities for the application-specific integrated circuits (ASICs) operating on each respective line card. Ethernet ports are utilized within the chassis to enable the utilization of standardized networking protocols, such as protocols on the data link layer (layer 2) within the OSI (Open Systems Interconnection) model. The implementation of SONiC and standardized networking techniques creates a simplified and more proficient routing system in the chassis framework.

18 Claims, 12 Drawing Sheets

(56) References Cited

U.S. PATENT DOCUMENTS

| | | | | | |
|---|---|---|---|---|---|
| 7,210,090 | B1* | 4/2007 | Stenfort | ............... | H04L 67/00 714/758 |
| 10,630,606 | B1* | 4/2020 | DiFerdinando | ......... | H04L 45/66 |
| 2002/0099532 | A1* | 7/2002 | Traut | ............... | G06F 9/45558 703/27 |
| 2004/0120340 | A1* | 6/2004 | Furey | ............... | H04L 69/22 370/429 |
| 2005/0120139 | A1* | 6/2005 | Kochhar | ............... | H04J 3/0685 709/248 |
| 2006/0092940 | A1* | 5/2006 | Ansari | ............... | H04L 45/60 370/392 |
| 2006/0092976 | A1* | 5/2006 | Lakshman | ............... | H04L 45/60 370/469 |
| 2011/0302346 | A1* | 12/2011 | Vahdat | ............... | H04L 49/40 710/301 |
| 2013/0266309 | A1* | 10/2013 | Binkert | ............... | H04L 49/30 398/19 |
| 2013/0346756 | A1* | 12/2013 | Cook | ............... | G06F 21/57 713/189 |
| 2015/0186206 | A1* | 7/2015 | Bhattacharya | ...... | G06F 11/3409 714/3 |
| 2016/0342510 | A1* | 11/2016 | Pani | ............... | G06F 12/0615 |
| 2016/0366019 | A1* | 12/2016 | Pani | ............... | H04L 63/20 |
| 2016/0380781 | A1* | 12/2016 | Rakib | ............... | H04N 21/6168 725/111 |
| 2017/0149936 | A1 | 5/2017 | Moon et al. | | |
| 2017/0244572 | A1* | 8/2017 | Kuwata | ............... | H04L 12/1886 |
| 2018/0102937 | A1 | 4/2018 | Casado et al. | | |
| 2018/0287966 | A1 | 10/2018 | Kamath et al. | | |
| 2019/0037033 | A1* | 1/2019 | Khakimov | ............ | H04L 61/256 |
| 2019/0166058 | A1* | 5/2019 | Xia | ............... | H04L 49/9047 |
| 2019/0230031 | A1* | 7/2019 | Mahishi | ............... | G06F 9/545 |
| 2020/0136972 | A1* | 4/2020 | Nguyen | ............... | H04L 41/0823 |
| 2020/0314029 | A1* | 10/2020 | Gopinath | ............ | H04L 49/354 |

OTHER PUBLICATIONS

BM-Switch.com. "White Box Switches: The Basics, Part 1" (Oct. 2018). https://bm-switch.com/index.php/blog/whitebox_basics_p1/ (Year: 2018).*

Mellanox. Mellanox Spectrum for Microsoft Azure SONiC (Jun. 2018). https://blog.mellanox.com/2018/06/mellanox-spectrum-for-microsoft-azure-sonic/ (Year: 2018).*

Microsoft. Microsoft—SONiC The networking switch software that powers the Microsoft Global Cloud (Dec. 2017). https://azure.microsoft.com/en-us/blog/sonic-the-networking-switch-software-that-powers-the-microsoft-global-cloud/ (Year: 2017).*

"OpenNSL", Retreived From:https://web.archive.org.web/20170704230635/https://www.broadcom.com/products/ethernet-connectivity/software/opennsl/, Jul. 1, 2017, 4 Pages.

"OpenNSL 2.0", Broadcom, Connecting Everything, Oct. 27, 2015, 2 Pages.

"Towards an Open, Disaggregated Network Operating System", Published in White Paper of AT&T's, Apr. 16, 2019, 17 Pages.

Khalidi, Yousef, "SONiC: The networking switch software that powers the Microsoft Global Cloud", Retrieved From: https://azure.microsoft.com/en-in/blog/sonic-the-networking-switch-software-that-powers-the-microsoft-global-cloud/, Mar. 8, 2017, 7 Pages.

Kiran, et al., "Cisco Open Network Environment: Bring the Network Closer to Applications", Published in White Paper of Cisco, Sep. 2015, 14 Pages.

Puijk, Erik, "Open-source network operating systems: feature evaluation of Sonic", Published in Thesis of Bachelor Informatica, University of Amsterdam, Jun. 7, 2018, 54 Pages.

Weerasinghe, et al., "Disaggregated FPGAs: Network Performance Comparison against Bare-Metal Servers, Virtual Machines and Linux Containers", In Proceedings of IEEE International Conference on Cloud Computing Technology and Science, Dec. 12, 2016, pp. 9-17.

"International Search Report and Written Opinion Issued in PCT Application No. PCT/US20/029166", dated Aug. 10, 2020, 17 Pages.

* cited by examiner

900

1000

US 11,018,973 B2

DISTRIBUTED SONIC FABRIC CHASSIS

BACKGROUND

Networking devices, such as switches and routers, come pre-configured with a proprietary operating system and other proprietary software from the device manufacturer, which can make customization, scalability, and flexibility difficult for those employing them.

SUMMARY

SONiC (Software for Open Networking in the Cloud) networking switch software is extended for use as an internal switch fabric in chassis-based network switches to thereby enable utilization of standard Ethernet ports and OSI (Open Systems Interconnection) Layer 2/Layer 3 routing protocols for interconnectivity between ASICs (application-specific integrated circuits) in front-end line cards and ASICs in the backplane. The SONiC software may be further adapted to provide network virtualization techniques such as VXLAN (virtual extensible local area network) and enhanced network functions such as BGP (Border Gateway Protocol) and RDMA (Remote Direct Memory Access). An instance of SONiC is distributed to each ASIC in the chassis, both in the line cards and backplane, to create a fabric that is disaggregated from the chassis hardware and which replaces the closed proprietary protocols, interfaces, operating systems, and customized ports that are conventionally used to support interconnectivity between the frontend and backend in conventional chassis architectures.

The distributed SONiC fabric is configured to provide a common control plane for the interconnected ASICs to enable utilization of standard networking protocols to manage chassis interconnect operations, for example, congestion control, queuing and buffer management, fabric self-healing, and error-recovery. The SONiC control plane has reduced complexity compared to the conventional supervisory modules in the chassis management plane and is thereby more failure resilient while exposing a control plane interface that is more performant for error detection, troubleshooting, and reporting. The distributed SONiC fabric enables the routing tables associated with the ASICs to be reduced in scale which can lower ASIC production costs and switch operating costs by displacing some routing control in the ASIC's data plane to the control plane of the SONiC fabric.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
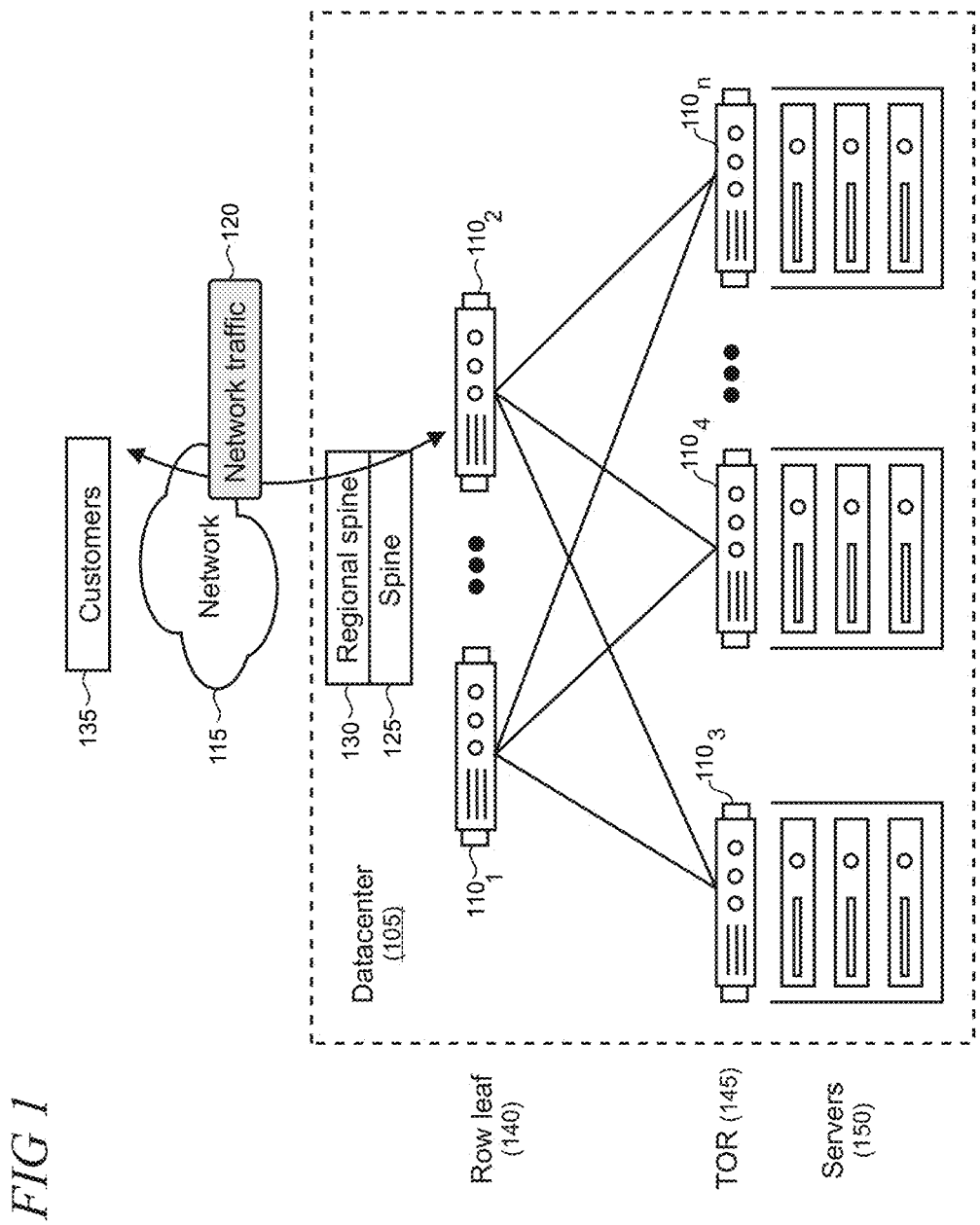
FIG. 1 shows an illustrative environment in which switching devices operate within a datacenter.

FIG. 1 shows an illustrative environment of a datacenter 105 in which multiple networking devices, such as routers and switching devices 110, route incoming network traffic 120 to remote servers 150 which may be operating as part of a cloud service infrastructure. The remote servers may be configured to host virtual machines to remotely provide solutions to customers, such as analytics, artificial intelligence (AI) processing, data storage, etc. The customers can access the servers over the network 115, which can include any one or more of a local area network, wide area network, the Internet, and the world wide web. The network infrastructure may span from the customers 135—e.g., the customer computing devices (not shown) that access the servers 150—to switching devices located at various layers in the datacenter including a regional spine 130, spine 125, row leaf 140, and top of rack (TOR) 145. In some embodiments, the switching devices 110 may be configured using a Clos topology.

Figure 2:
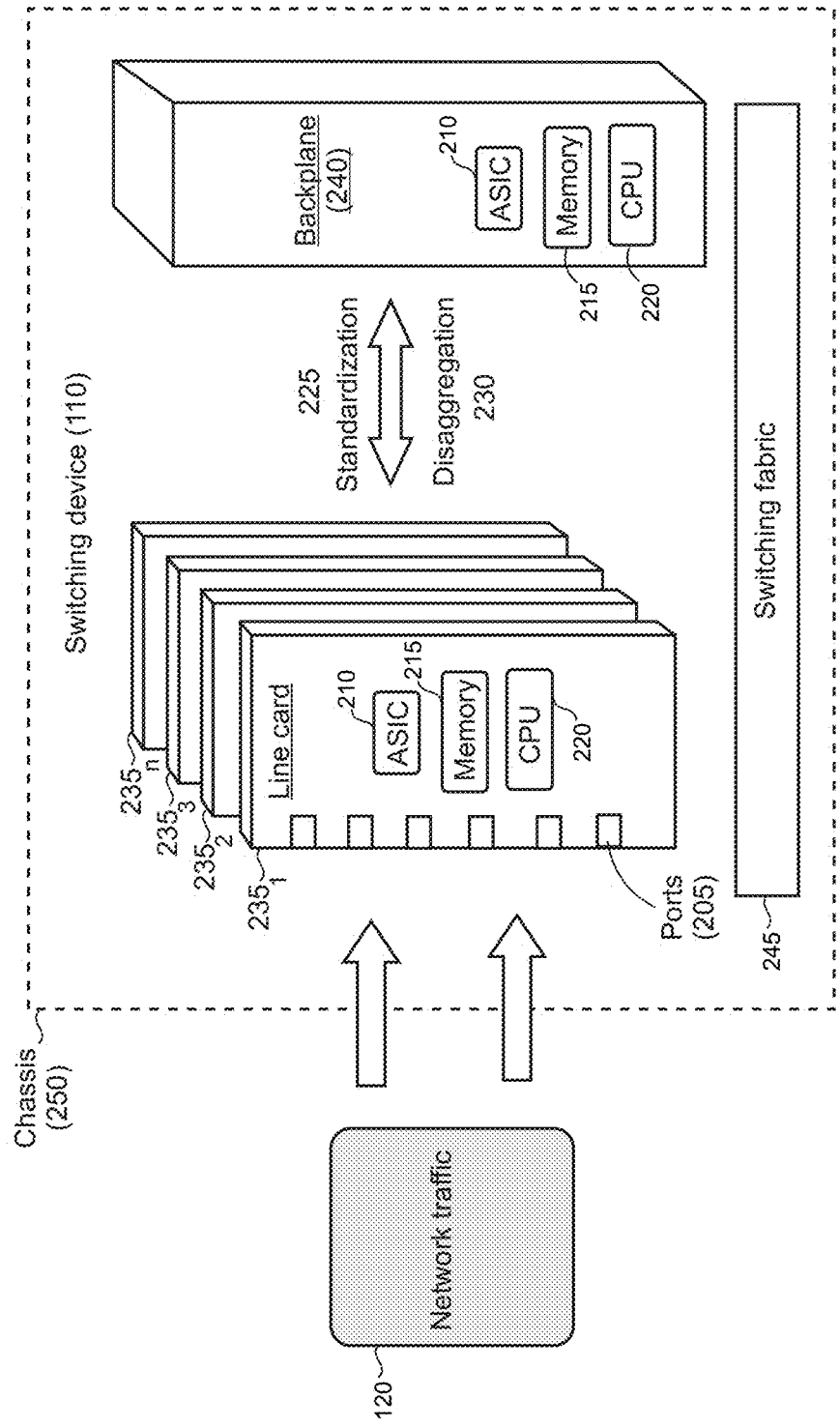
FIG. 2 shows an illustrative architecture of a switching device.

FIG. 2 shows an illustrative simplified architecture of the switching device 110 operating as a chassis-based network switch. The chassis 250 provides the frame for the networking components, which can typically be arranged as insertable trays or units. The line cards 235 include ports 205 to receive and forward incoming network traffic 120, such as data packets. Each line card may be configured with the ports 205, an application-specific integrated circuit (ASIC) 210, memory 215, and a central processing unit 220 or networking controller. The line cards interface with a backplane 240 which is likewise configured with an ASIC 210, memory 215, CPU 220, and ports (not shown). The switching fabric 245 is the interconnection among the line cards and backplane for the transmission of data through the chassis-based switch 110. As discussed in greater detail below, the configuration of the switch facilitates standardization among the components and disaggregation of the software from the hardware within a bare-metal switch device, as representatively shown by numerals 225 and 230.

Figure 3:
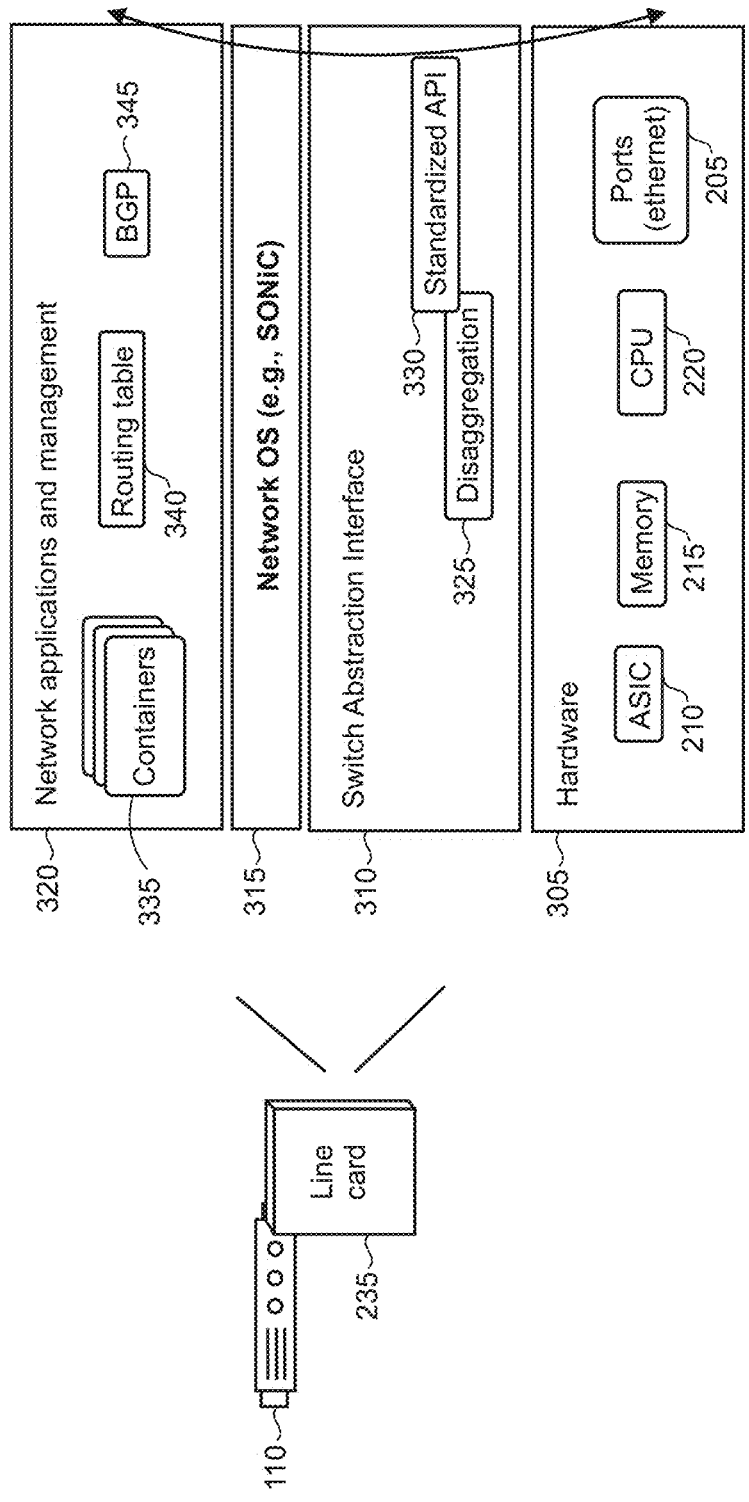
FIG. 3 shows an illustrative layered architecture of the switching device.

FIG. 3 shows an illustrative layered architecture of a line card 235 within the chassis-based switch 110. While the line card is depicted in FIG. 3, the architecture may similarly apply to the backplane or other networking devices, such as a router. The line card includes a hardware layer 305, a switch abstraction interface (SAI) layer 310, a network operating system (OS) layer 315 (e.g., SONiC (Software for Open Networking in the Cloud)), and a network applications and management layer 320. Although not shown, in typical implementations, other layered components may be utilized within the switch, such as a kernel space for an ASIC driver and a user space for an ASIC SDK (software development kit).

The hardware layer can include the ASIC 210; memory 215, which can include a buffer, cache, or flash storage; the CPU 220; and ports 205, as discussed with respect to FIG. 2. Ethernet ports may be implemented within the chassis to enable the line cards and backplane to communicate using standardized networking protocols, such as protocols at layers 2 and 3 within the OSI (Open Systems Interconnection) model. The CPU may be utilized to operate the containers or applications instantiated on the network OS. The ASIC may be configured to route incoming data packets to virtual machines instantiated on servers within the datacenter 105 (FIG. 1).

The switch abstraction interface layer 310 can provide a standard interface which enables disaggregation between commodity hardware and software components on the line card 235 and backplane 240. The SAI may include a set of standardized application programming interfaces (API) 330 to facilitate communication between the containers and other network applications on the network OS and the commodity hardware, thereby enabling disaggregation 325. SONiC is an exemplary open source network OS based on Linux® which utilizes multiple containerized components that can facilitate extensibility, scalability, and customization. The implementation of SONiC enables the utilization of different types of hardware equipment supplied from different vendors within the same chassis, including the ASIC, memory, CPU, and the line cards and backplanes themselves.

While SONiC enables the utilization of disaggregated datacenters in which different types of equipment from different manufacturing entities can be employed, the SONiC platform used herein can likewise be utilized inside aggregated datacenters. Employing aggregated components in a datacenter that utilizes the SONiC platform provides its own set of technical benefits. For example, using aggregated components can save power and space because the manufacturing entity is capable of manipulating component density within the chassis. Copper traces can be utilized to interconnect components that, for example, are employed within a same rack unit to thereby increase density. While SONiC enables companies to purchase and assemble different types of components from different vendors, an original equipment manufacturer (OEM) may have greater experience and be in a better position to densely package the components. Furthermore, the utilization of copper as a medium over which data is transmitted is typically utilized in aggregated implementations, which can utilize less power relative to its fiber optic counterpart.

The network applications and management layer 320 may include containers 335 which can include network applications and management tools which provide users with control over the operations of the line card 235. The applications and management layer 320 can control a routing table 340 that can be used by the ASIC for routing incoming data packets and can further be configured with BGP (Border Gateway Protocol) 345 to manage data packet routing through the datacenter 105 (FIG. 1). Using the routing table on the SONiC platform can reduce the amount of memory necessary to operate the ASIC, which can in turn enable the implementation of smaller and cheaper ASIC devices that consume less power.

Figure 4:
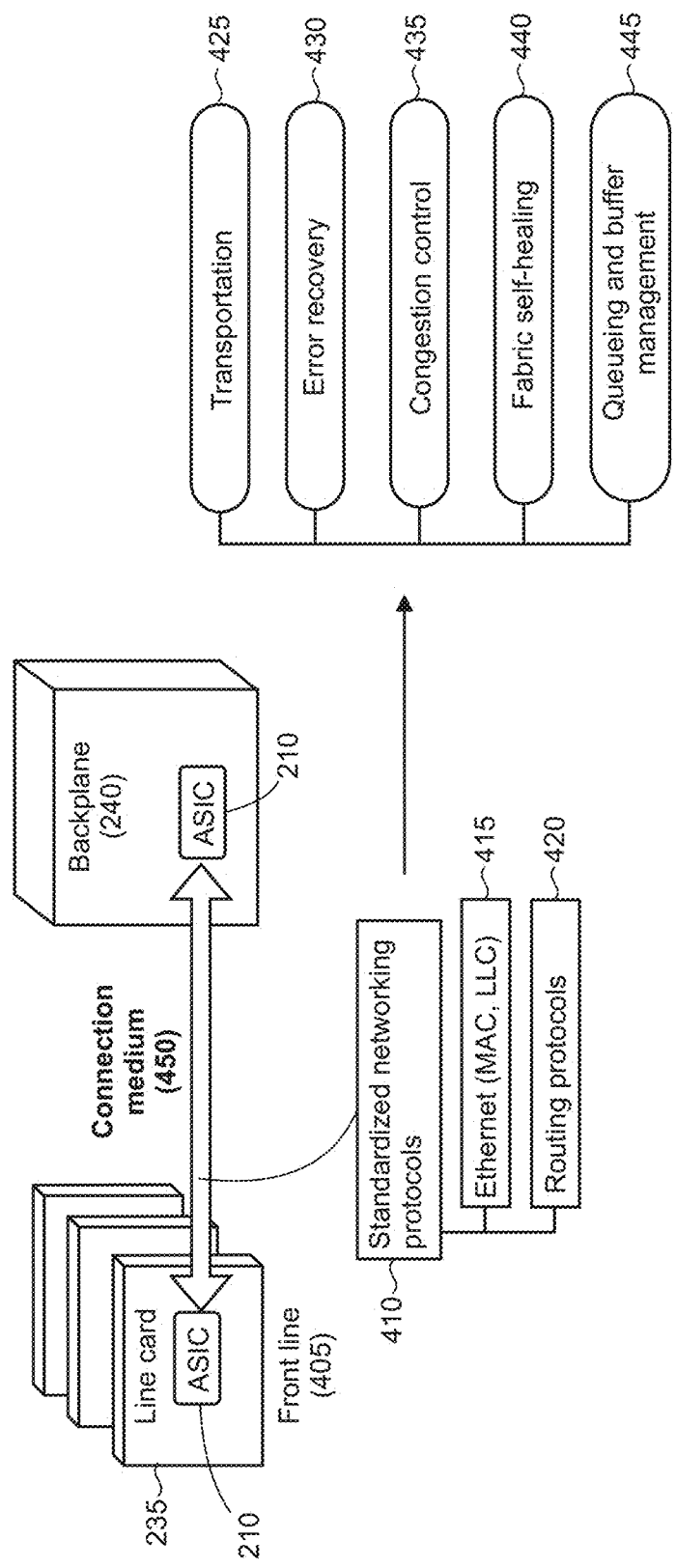
FIG. 4 shows an illustrative diagram in which a line card's application-specific integrated circuit (ASIC) communicates with a backplane's ASIC using standardized networking protocols.

FIG. 4 shows an illustrative environment in which the line cards 235 are configured to utilize standardized networking protocols 410 to communicate with the backplane 240 and interconnect the ASICs operating within the chassis. For example, a connection medium 450 (e.g., optical fiber, twisted and untwisted pair copper, copper traces, etc.) can be utilized over which routing protocols on layer 2 (data link) and layer 3 (network) in the OSI model can be utilized. Media access control (MAC) addressing, logical link control (LLC), and routing protocols can be utilized due to the deployment of Ethernet, as representatively shown by numerals 415 and 420. The standardized networking protocols can be used by the chassis-based switch for transportation 425 of data packets, error recovery 430, congestion control 435, fabric self-healing 440, and queueing and buffer management 445.

Figure 5:
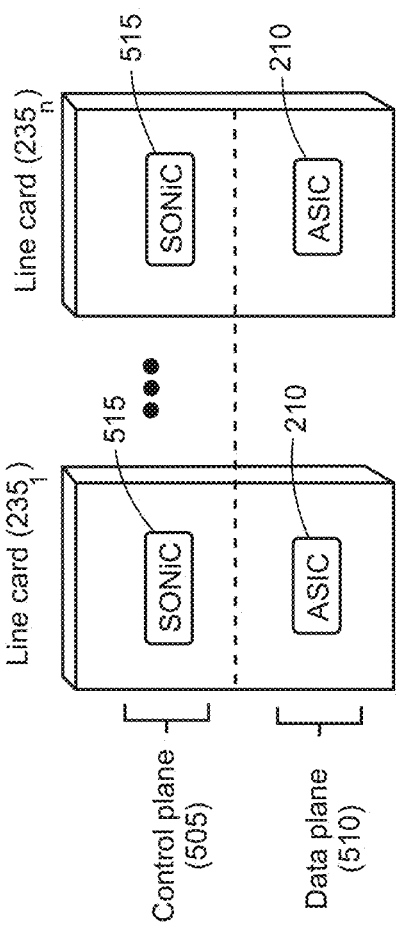
FIG. 5 shows an illustrative diagram in which the SONiC platform for the line cards operates as a control plane to the data plane at the ASIC.

FIG. 5 shows an illustrative diagram in which SONiC 515 functions as the control plane 505 and the ASIC functions as the data plane 510 in the present implementation. Due to the implementation of SONiC, networking application and management functions can be instantiated in and utilized by the line cards to enable the SONiC platform to function as the control plane to the ASIC. For example, the ASIC can consult applications running on SONiC for routing determinations and BGP.

Figure 6:
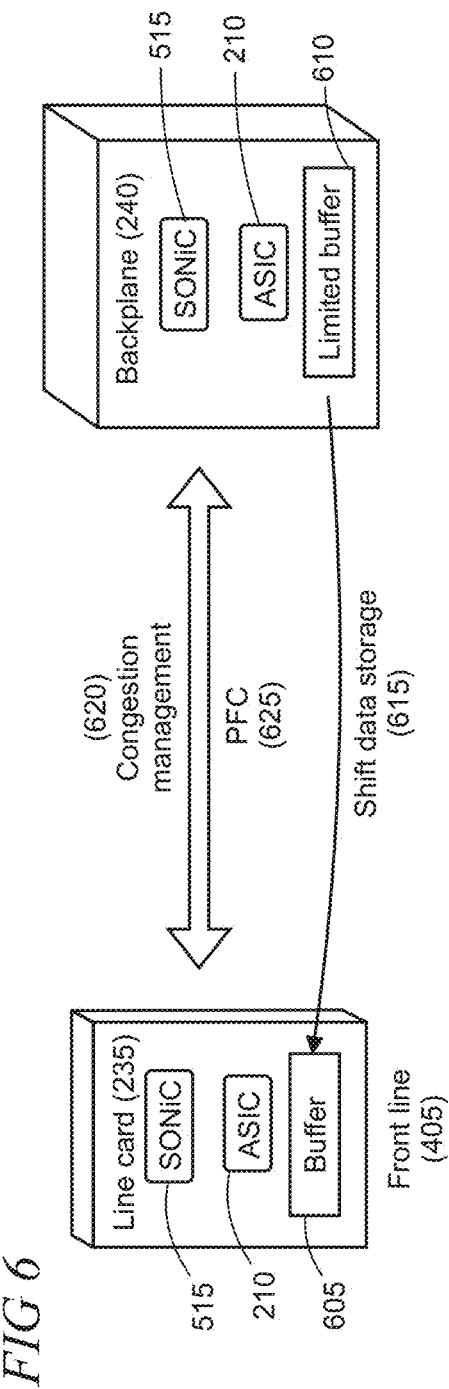
FIG. 6 shows an illustrative diagram in which the SONiC platform enables congestion management for the line cards.

FIG. 6 shows an illustrative diagram in which the implementation of SONiC enables congestion management 620 functionality among the line cards 235 and the backplane 240. PFC (priority flow control) 625 is implemented across the chassis components, in which the backplane can transmit a signal to the respective line card to stop transmitting data packets. The line cards can manage congestion using their respective buffers given the size of the limited buffer 610 associated with the backplane and the relatively larger sized buffer 605 utilized by the line cards. Data storage can thereby be shifted to the front line 405 line cards, as representatively shown by numeral 615.

Figure 7:
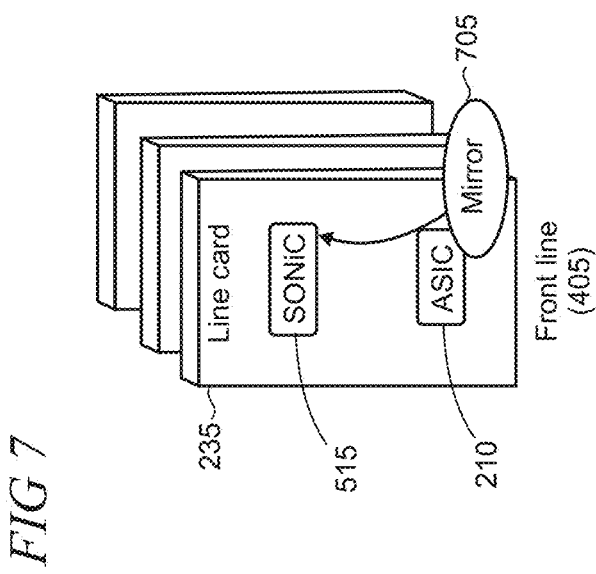
FIG. 7 shows an illustrative diagram in which the line card's ASIC mirrors data packets to an application on the SONiC platform.

FIG. 7 shows an illustrative diagram in which the implementation of SONiC further enables the ASIC 210 to mirror 705 incoming data packets to a container instantiated on SONiC 515. The mirroring functionality, which can enable capturing and tracking data packets for error detection, can be instantiated at each hardware component within the switch-based chassis device, including the line cards and backplane.

Figure 8:
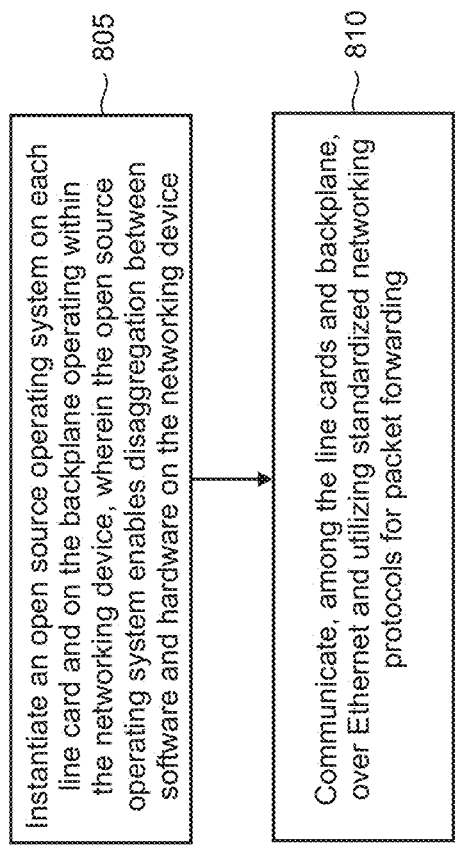
FIGS. 8-10 are flowcharts of illustrative methods performed by a networking device such as a switching device.
Figure 9:
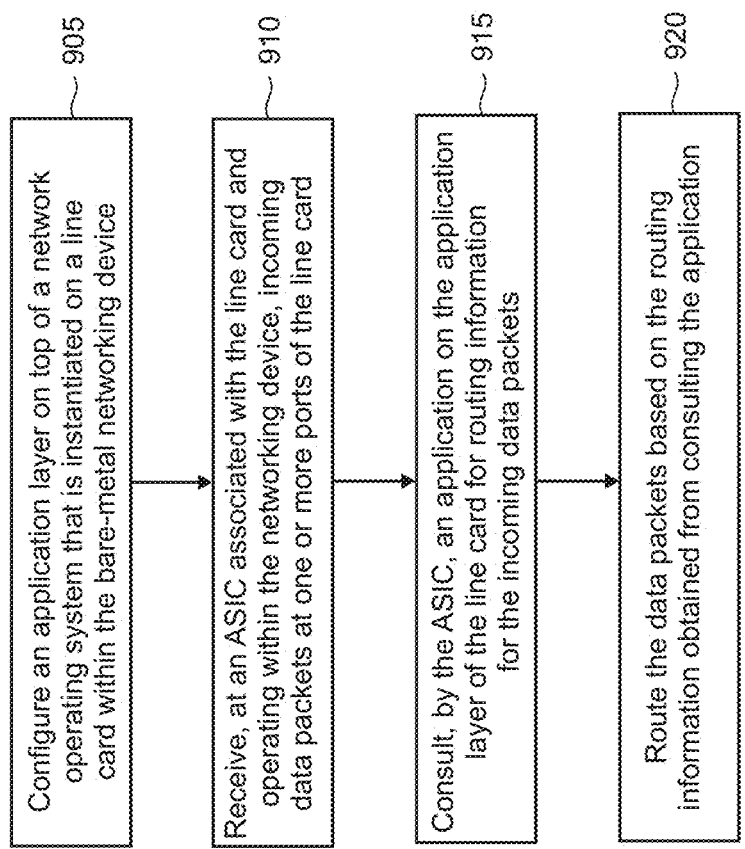
Figure 10:
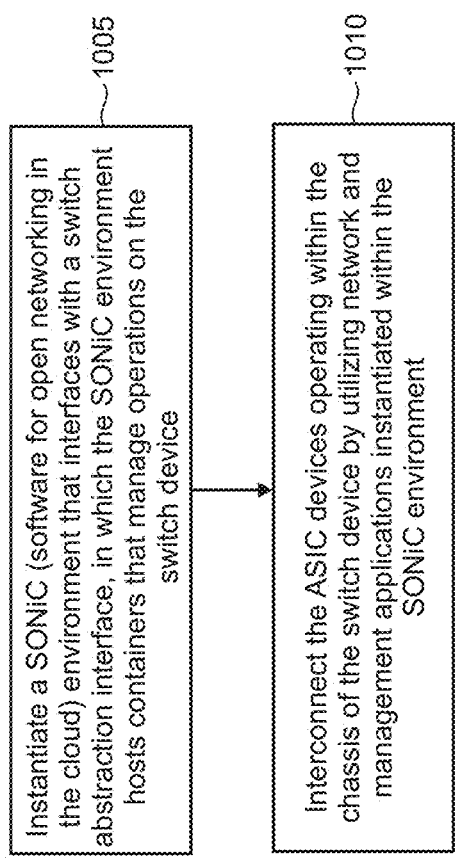

FIGS. 8-10 are flowcharts of illustrative methods 800, 900, and 1000, that may be performed on a chassis-based switch device or other networking device, such as a router. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 805, in FIG. 8, a networking device instantiates an open source operating system on each line card and on a backplane operating within the networking device, wherein the open source operating system enables disaggregation between software and hardware on the networking device. In step 810, the line cards and backplane communicate over Ethernet and utilize standardized networking protocols for packet forwarding.

In step 905, in FIG. 9, a networking device configures an application layer on top of a network operating system that is instantiated on a line card within the bare-metal networking device. In step 910, the networking device receives, at an ASIC associated with the line card and operating within the networking device, incoming data packets at one or more ports of the line card. In step 915, the ASIC consults an application on the application layer of the line card for routing information for the incoming data packets. In step 920, the ASIC routes the data packets based on the routing information obtained from consulting the application.

In step 1005, in FIG. 10, a switch device instantiates a SONiC (Software for Open Networking in the Cloud) environment that interfaces with a switch abstraction interface, in which the SONiC environment hosts containers that manage operations on the switch device. In step 1010, the switch device interconnects the ASIC devices operating within the chassis of the switch device by utilizing network and management applications instantiated within the SONiC environment.

Figure 11:
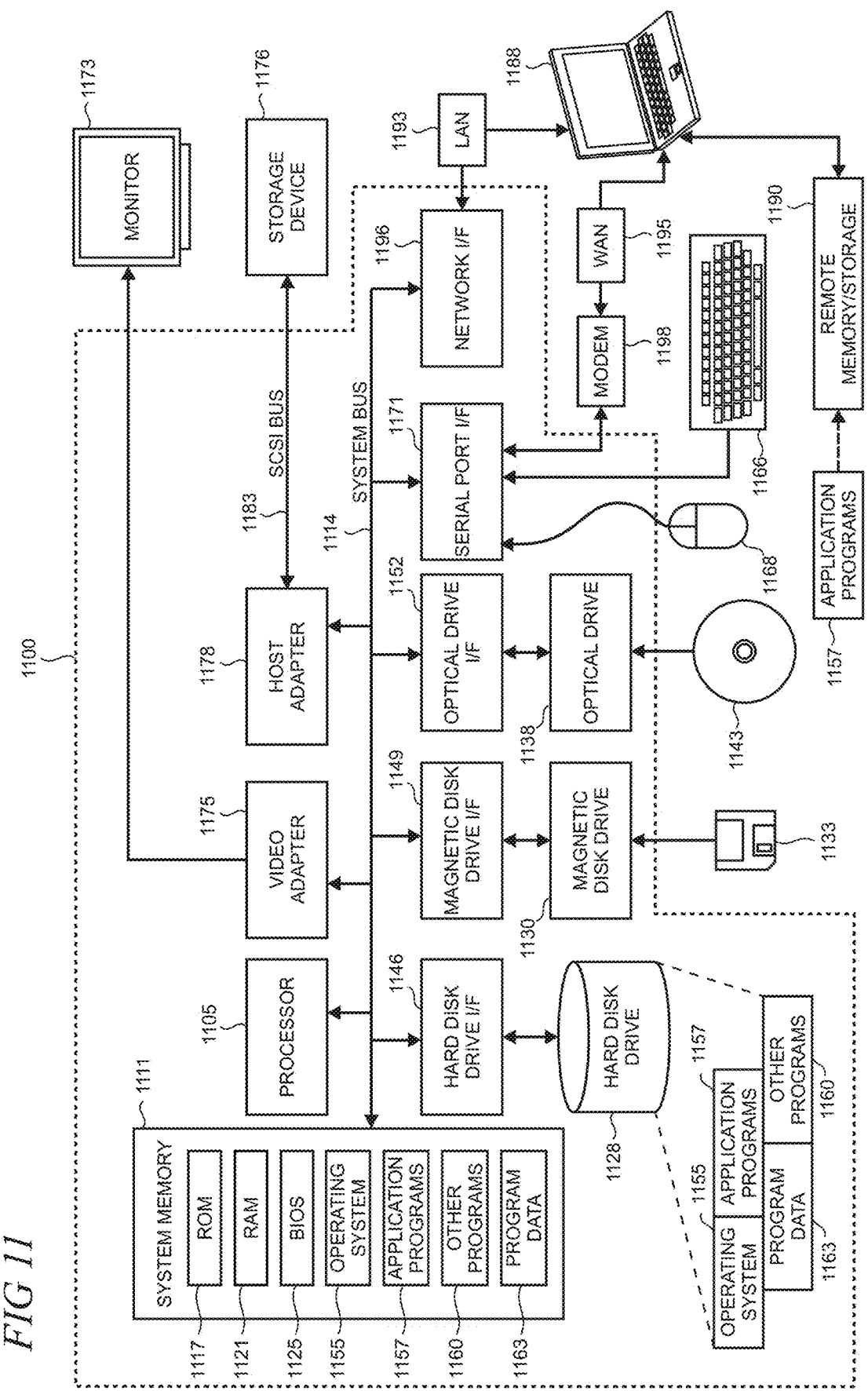
FIG. 11 is a simplified block diagram of an illustrative remote service or computer system that may be used in part to implement the present distributed SONiC fabric chassis.

FIG. 11 is a simplified block diagram of an illustrative computer system 1100 such as a PC or server with which the present distributed SONiC fabric chassis may be implemented. For example, the switch device 110 may communicate with the computer system 1100. Computer system 1100 includes a processor 1105, a system memory 1111, and a system bus 1114 that couples various system components including the system memory 1111 to the processor 1105. The system bus 1114 may be any of several types of bus structures including a memory bus or memory controller, a peripheral bus, or a local bus using any of a variety of bus architectures. The system memory 1111 includes read only memory (ROM) 1117 and random-access memory (RAM) 1121. A basic input/output system (BIOS) 1125, containing the basic routines that help to transfer information between elements within the computer system 1100, such as during startup, is stored in ROM 1117. The computer system 1100 may further include a hard disk drive 1128 for reading from and writing to an internally disposed hard disk (not shown), a magnetic disk drive 1130 for reading from or writing to a removable magnetic disk 1133 (e.g., a floppy disk), and an optical disk drive 1138 for reading from or writing to a removable optical disk 1143 such as a CD (compact disc), DVD (digital versatile disc), or other optical media. The hard disk drive 1128, magnetic disk drive 1130, and optical disk drive 1138 are connected to the system bus 1114 by a hard disk drive interface 1146, a magnetic disk drive interface 1149, and an optical drive interface 1152, respectively. The drives and their associated computer-readable storage media provide non-volatile storage of computer-readable instructions, data structures, program modules, and other data for the computer system 1100. Although this illustrative example includes a hard disk, a removable magnetic disk 1133, and a removable optical disk 1143, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present distributed SONiC fabric chassis. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and do not include waves, signals, and/or other transitory and/or intangible communication media.

A number of program modules may be stored on the hard disk, magnetic disk 1133, optical disk 1143, ROM 1117, or RAM 1121, including an operating system 1155, one or more application programs 1157, other program modules 1160, and program data 1163. A user may enter commands and information into the computer system 1100 through input devices such as a keyboard 1166 and pointing device 1168 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 1105 through a serial port interface 1171 that is coupled to the system bus 1114, but may be connected by other interfaces, such as a parallel port, game port, or universal serial bus (USB). A monitor 1173 or other type of display device is also connected to the system bus 1114 via an interface, such as a video adapter 1175. In addition to the monitor 1173, personal computers typically include other peripheral output devices (not shown), such as speakers and printers. The illustrative example shown in FIG. 11 also includes a host adapter 1178, a Small Computer System Interface (SCSI) bus 1183, and an external storage device 1176 connected to the SCSI bus 1183.

The computer system 1100 is operable in a networked environment using logical connections to one or more remote computers, such as a remote computer 1188. The remote computer 1188 may be selected as another personal computer, a server, a router, a network PC, a peer device, or other common network node, and typically includes many or all of the elements described above relative to the computer system 1100, although only a single representative remote memory/storage device 1190 is shown in FIG. 11. The logical connections depicted in FIG. 11 include a local area network (LAN) 1193 and a wide area network (WAN) 1195. Such networking environments are often deployed, for example, in offices, enterprise-wide computer networks, intranets, and the Internet.

When used in a LAN networking environment, the computer system 1100 is connected to the local area network 1193 through a network interface or adapter 1196. When used in a WAN networking environment, the computer system 1100 typically includes a broadband modem 1198, network gateway, or other means for establishing communications over the wide area network 1195, such as the Internet. The broadband modem 1198, which may be internal or external, is connected to the system bus 1114 via a serial port interface 1171. In a networked environment, program modules related to the computer system 1100, or portions thereof, may be stored in the remote memory storage device 1190. It is noted that the network connections shown in FIG. 11 are illustrative and other means of establishing a communications link between the computers may be used depending on the specific requirements of an application of the present distributed SONiC fabric chassis.

Figure 12:
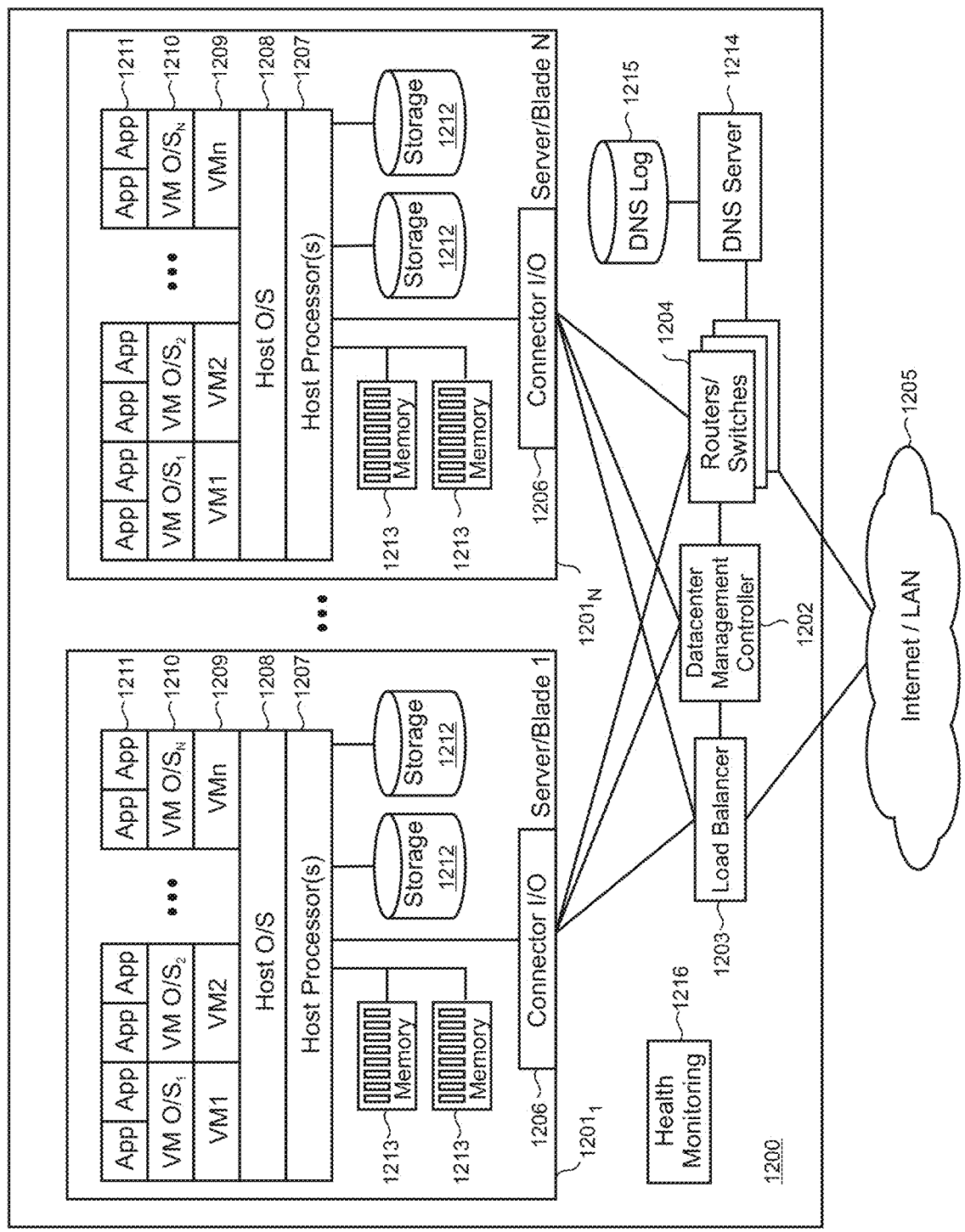
FIG. 12 is a block diagram of an illustrative datacenter that may be used at least in part to implement the present distributed SONiC fabric chassis.

FIG. 12 is a high-level block diagram of an illustrative datacenter 1200 that provides cloud computing services or distributed computing services that may be used to implement the present distributed SONiC fabric chassis. A plurality of servers 1201 are managed by datacenter management controller 1202. Load balancer 1203 distributes requests and computing workloads over servers 1201 to avoid a situation wherein a single server may become overwhelmed. Load balancer 1203 maximizes available capacity and performance of the resources in datacenter 1200. Routers/switches 1204 support data traffic between servers 1201 and between datacenter 1200 and external resources and users (not shown) via an external network 1205, which may be, for example, a local area network (LAN) or the Internet.

Servers 1201 may be standalone computing devices, and/or they may be configured as individual blades in a rack of one or more server devices. Servers 1201 have an input/output (I/O) connector 1206 that manages communication with other database entities. One or more host processors 1207 on each server 1201 run a host operating system (O/S) 1208 that supports multiple virtual machines (VM) 1209. Each VM 1209 may run its own O/S so that each VM O/S 1210 on a server is different, or the same, or a mix of both. The VM O/S's 1210 may be, for example, different versions of the same O/S (e.g., different VMs running different current and legacy versions of the Windows® operating system). In addition, or alternatively, the VM O/S's 1210 may be provided by different manufacturers (e.g., some VMs running the Windows® operating system, while other VMs are running the Linux® operating system). Each VM 1209 may also run one or more applications (Apps) 1211. Each server 1201 also includes storage 1212 (e.g., hard disk drives (HDD)) and memory 1213 (e.g., RAM) that can be accessed and used by the host processors 1207 and VMs 1209 for storing software code, data, etc. In one embodiment, a VM 1209 may employ the data plane APIs as disclosed herein.

Datacenter 1200 provides pooled resources on which customers can dynamically provision and scale applications as needed without having to add servers or additional networking. This allows customers to obtain the computing resources they need without having to procure, provision, and manage infrastructure on a per-application, ad-hoc basis. A cloud computing datacenter 1200 allows customers to scale up or scale down resources dynamically to meet the current needs of their business. Additionally, a datacenter operator can provide usage-based services to customers so that they pay for only the resources they use, when they need to use them. For example, a customer may initially use one VM 1209 on server $1201_1$ to run their applications 1211. When demand for an application 1211 increases, the datacenter 1200 may activate additional VMs 1209 on the same server $1201_1$ and/or on a new server $1201_N$ as needed. These additional VMs 1209 can be deactivated if demand for the application later drops.

Datacenter 1200 may offer guaranteed availability, disaster recovery, and back-up services. For example, the datacenter may designate one VM 1209 on server $1201_1$ as the primary location for the customer's applications and may activate a second VM 1209 on the same or different server as a standby or back-up in case the first VM or server $1201_1$ fails. Datacenter management controller 1202 automatically shifts incoming user requests from the primary VM to the back-up VM without requiring customer intervention. Although datacenter 1200 is illustrated as a single location, it will be understood that servers 1201 may be distributed to multiple locations across the globe to provide additional redundancy and disaster recovery capabilities. Additionally, datacenter 1200 may be an on-premises, private system that provides services to a single enterprise user or may be a publicly accessible, distributed system that provides services to multiple, unrelated customers or may be a combination of both.

Domain Name System (DNS) server 1214 resolves domain and host names into IP (Internet Protocol) addresses for all roles, applications, and services in datacenter 1200. DNS log 1215 maintains a record of which domain names have been resolved by role. It will be understood that DNS is used herein as an example and that other name resolution services and domain name logging services may be used to identify dependencies.

Datacenter health monitoring 1216 monitors the health of the physical systems, software, and environment in datacenter 1200. Health monitoring 1216 provides feedback to datacenter managers when problems are detected with servers, blades, processors, or applications in datacenter 1200 or when network bandwidth or communications issues arise.

Figure 13:
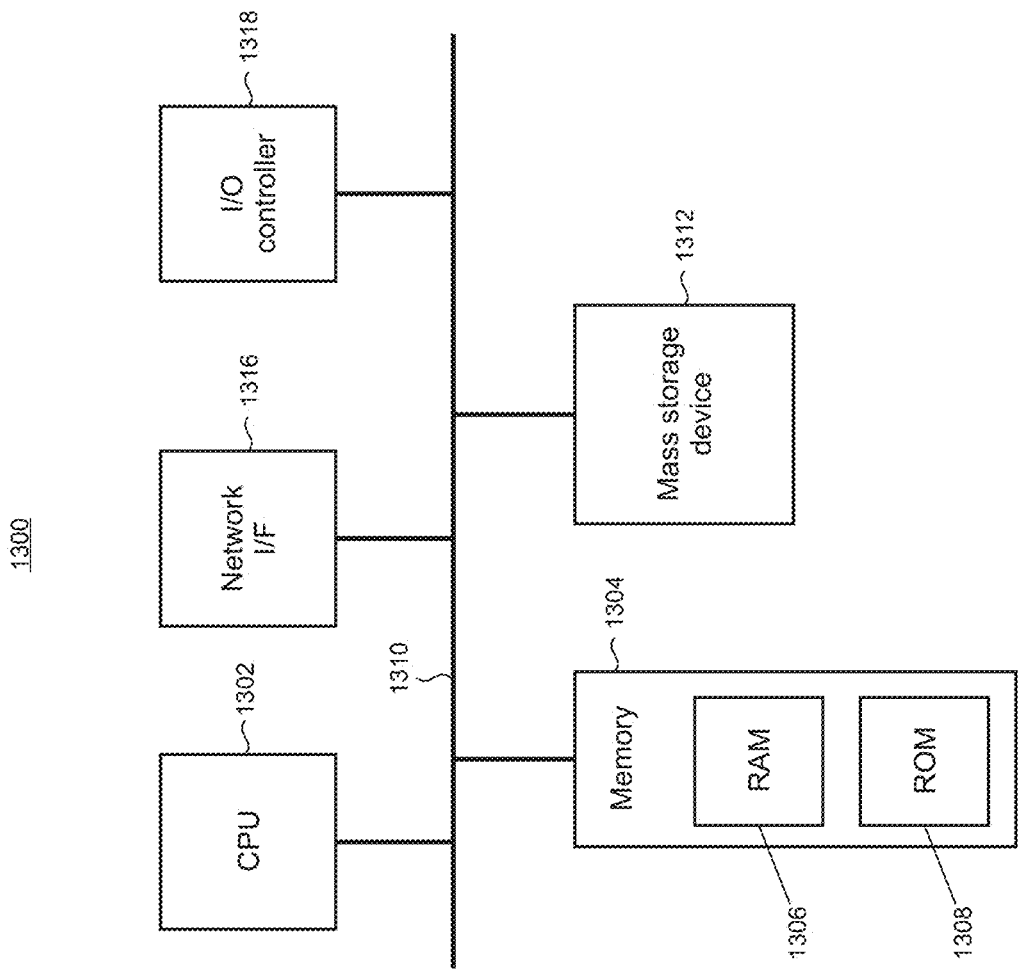
FIG. 13 is a simplified block diagram of an illustrative architecture of a computing device, such as a smartphone or personal computer, that may be used to implement the present distributed SONiC fabric chassis.

FIG. 13 shows an illustrative architecture 1300 for a computing device such as a smartphone, tablet computer, laptop computer, or personal computer for the present distributed SONiC fabric chassis. The computing device in FIG. 13 may, for example, be a customer computing device that communicates with the datacenter. While some components are depicted in FIG. 13, other components disclosed herein but not shown are also possible with the computing device.

The architecture 1300 illustrated in FIG. 13 includes one or more processors 1302 (e.g., central processing unit, dedicated Artificial Intelligence chip, graphics processing unit, etc.), a system memory 1304, including RAM (random access memory) 1306 and ROM (read only memory) 1308, and a system bus 1310 that operatively and functionally couples the components in the architecture 1300. A basic input/output system containing the basic routines that help to transfer information between elements within the architecture 1300, such as during startup, is typically stored in the ROM 1308. The architecture 1300 further includes a mass storage device 1312 for storing software code or other computer-executed code that is utilized to implement applications, the file system, and the operating system. The mass storage device 1312 is connected to the processor 1302 through a mass storage controller (not shown) connected to the bus 1310. The mass storage device 1312 and its associated computer-readable storage media provide non-volatile storage for the architecture 1300. Although the description of computer-readable storage media contained herein refers to a mass storage device, such as a hard disk or CD-ROM drive, it may be appreciated by those skilled in the art that computer-readable storage media can be any available storage media that can be accessed by the architecture 1300.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVD, HD-DVD (High Definition DVD), Blu-ray or other optical storage, magnetic cassette, magnetic tape, magnetic disk storage or other magnetic storage device, or any other medium which can be used to store the desired information and which can be accessed by the architecture 1300.

According to various embodiments, the architecture 1300 may operate in a networked environment using logical connections to remote computers through a network. The architecture 1300 may connect to the network through a network interface unit 1316 connected to the bus 1310. It may be appreciated that the network interface unit 1316 also may be utilized to connect to other types of networks and remote computer systems. The architecture 1300 also may include an input/output controller 1318 for receiving and processing input from a number of other devices, including a keyboard, mouse, touchpad, touchscreen, control devices such as buttons and switches or electronic stylus (not shown in FIG. 13). Similarly, the input/output controller 1318 may provide output to a display screen, user interface, a printer, or other type of output device (also not shown in FIG. 13).

It may be appreciated that the software components described herein may, when loaded into the processor 1302 and executed, transform the processor 1302 and the overall architecture 1300 from a general-purpose computing system into a special-purpose computing system customized to facilitate the functionality presented herein. The processor 1302 may be constructed from any number of transistors or other discrete circuit elements, which may individually or collectively assume any number of states. More specifically, the processor 1302 may operate as a finite-state machine, in response to executable instructions contained within the software modules disclosed herein. These computer-executable instructions may transform the processor 1302 by specifying how the processor 1302 transitions between states, thereby transforming the transistors or other discrete hardware elements constituting the processor 1302.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1300 in order to store and execute the software components presented herein. It also may be appreciated that the architecture 1300 may include other types of computing devices, including wearable devices, handheld computers, embedded computer systems, smartphones, PDAs, and other types of computing devices known to those skilled in the art. It is also contemplated that the architecture 1300 may not include all of the components shown in FIG. 13, may include other components that are not explicitly shown in FIG. 13, or may utilize an architecture completely different from that shown in FIG. 13.

Various exemplary embodiments of the present distributed SONiC fabric chassis are now presented by way of illustration and not as an exhaustive list of all embodiments. An example includes a networking device that operates within a chassis and has components which utilize standardized networking protocols for communicating with other components within the networking device, comprising: application-specific integrated circuits (ASICs) operating on line cards and on a backplane within the networking device, the networking device being configured for packet forwarding; one or more processors; and one or more hardware-based non-transitory memory devices storing computer-readable instructions which, when executed by the one or more processors, cause the networking device to: instantiate an open source operating system on each line card and on the backplane operating within the networking device, wherein the open source operating system enables disaggregation between software and hardware on the networking device, wherein the open source operating system includes network and management applications which are configured to enable each respective line card to locally operate as a control plane for forwarding data packets; and communicate, among the line cards and the backplane, over Ethernet and utilize standardized networking protocols for packet forwarding.

In another example, the open source operating system is SONiC (Software for Open Networking in the Cloud). In another example, the standardized networking protocols enable communications at layer 2 within an OSI (Open Systems Interconnection) model. In a further example, the standardized networking protocols are utilized for data transfer failures among the line cards and the backplane. In another example, each line card stores a routing table for utilization by the respective ASICs for forwarding the data packets. In another example, the line cards individually perform congestion management by storing data packets within local buffers. In another example, the network and management applications include a border gateway protocol (BGP) container to enable line cards to route incoming data packets. In a further example, each ASIC associated with a respective line card is configured to mirror data packets to an application of the network and management applications. In a further example, the network and management applications include an application with RDMA (remote direct memory access) functionality. In a further example, the network and management applications further include an application to perform VXLAN (virtual extensible local area network) functions on incoming data packets.

A further example includes one or more hardware-based non-transitory computer-readable memory devices storing computer-readable instructions which, when executed by one or more processors in a bare-metal networking device, cause the networking device to: configure an application layer on top of a network operating system that is instantiated on a line card within the bare-metal networking device, wherein the application layer is configured with data packet routing capabilities to operate as a control plane for data packet forwarding by the line card; receive, at an application-specific integrated circuit (ASIC) associated with the line card and operating within the networking device, incoming data packets at one or more ports of the line card; consult, by the ASIC, an application on the application layer of the line card for routing information for the incoming data packets; and route, by the ASIC, the data packets based on the routing information obtained from consulting the application.

In another example, each line card within the networking device is configured with the network operating system and is configured with data packet routing capabilities at an application layer on top of the network operating system, and each application layer of the line cards is configured to function as a control plane for incoming data packets. In another example, a backplane operating within the networking device is likewise configured with the network operating system. In a further example, each ASIC respectively associated with the line cards and backplane communicate with each other using layer 2 or layer 3 networking protocols within an OSI (Open Systems Interconnection) model. In another example, the ASICs communicate over Ethernet protocols. In a further example, the ASICs communicate using at least logical link control (LLC) or media access control (MAC) addressing.

A further example includes a method performed by a switch device that is configured to utilize standardized networking protocols of an OSI (Open Systems Interconnection) model, in which line cards and a backplane within a chassis of the switch device use the standardized networking protocols to communicate with each other, the method comprising: instantiating a SONiC (Software for Open Networking in the Cloud) environment that interfaces with a switch abstraction interface, in which the SONiC environment hosts containers that manage operations on the switch device, wherein the SONiC environment is configured to function, at least in part, as a control plane for the switch device; and interconnecting application-specific integrated circuits (ASICs) operating within the chassis of the switch device by utilizing network and management applications instantiated within the SONiC environment, in which the network and management applications enable the interconnected ASICs to transport data packets and perform error recovery.

In another example, the SONiC environment is based on Linux®. In another example, the SONiC environment hosts a routing table which is utilized by the ASICs to route incoming data packets. In another example, the SONiC environment hosts BGP (border gateway protocol) for packet forwarding.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A bare-metal networking device that operates within a chassis and has components which utilize standardized networking protocols for communicating with other components within the bare-metal networking device, comprising:

application-specific integrated circuits (ASICs) operating on front-end line cards and on a backplane within the bare-metal networking device, the bare-metal networking device being configured for packet forwarding;

one or more processors; and one or more hardware-based non-transitory memory devices storing computer-readable instructions which, when executed by the one or more processors, cause the bare-metal networking device to:

utilize an instance of an open source operating system that is distributed among each front-end line card and on the backplane operating within the bare-metal networking device chassis, wherein the distributed open source operating system enables disaggregation between software and hardware on the front-end line cards and the backplane, wherein the instances of the open source operating system are utilized in place of a proprietary operating system that is configured to connect the front-end line cards and the backplane, wherein the open source operating system is SONiC (Software for Open Networking in the Cloud), wherein the open source operating system supports one or more network and management applications which are configured to provide each respective ASIC on the front end line cards with a commonly shared control plane for managing data packet forwarding operations in the bare-metal networking device; and communicate, among the front-end line cards and the backplane using the commonly shared control plane, over Ethernet and perform data packet forwarding in accordance with standardized networking protocols.

2. The bare-metal networking device of claim 1, in which the standardized networking protocols enable communications at layer 2 within an OSI (Open Systems Interconnection) model.

3. The bare-metal networking device of claim 1, in which the standardized networking protocols comprise at least one of layer 2 or layer 3 protocols in the OSI (Open System Interconnection) model and in which data-transfer errors among the front-end line cards and the backplane are recovered in accordance with the at least one of layer 2 or layer 3 protocols.

4. The bare-metal networking device of claim 1, in which each front-end line card stores a routing table for utilization by the respective ASICs for forwarding the data packets.

5. The bare-metal networking device of claim 1, in which the front-end line cards individually perform congestion management by storing data packets within local buffers.

6. The bare-metal networking device of claim 1, in which the network and management applications include a border gateway protocol (BGP) container to enable front-end line cards to route incoming data packets.

7. The bare-metal networking device of claim 1, in which each ASIC associated with a respective front-end line card is configured to mirror data packets to an application of the network and management applications.

8. The bare-metal networking device of claim 1, in which the network and management applications include an application with RDMA (remote direct memory access) functionality.

9. The bare-metal networking device of claim 1, in which the network and management applications further include an application to perform VXLAN (virtual extensible local area network) functions on incoming data packets.

10. One or more hardware-based non-transitory computer-readable memory devices storing computer-readable instructions which, when executed by one or more processors in a bare-metal networking device, cause the bare-metal networking device to:
  operate application-specific integrated circuits (ASICs) on front-end line cards and on a backplane within the bare-metal networking device,
  utilize an instance of an open source operating system that is distributed among each front-end line card and on the backplane operating within the bare-metal networking device chassis, wherein the distributed open source operating system enables disaggregation between software and hardware on the front-end line cards and the backplane,
    wherein the instances of the open source operating system are utilized in place of a proprietary operating system that is configured to connect the front-end line cards and the backplane,
    wherein the open source operating system is SONiC (Software for Open Networking in the Cloud),
    wherein the open source operating system supports one or more network and management applications which are configured to provide each respective ASIC on the front end line cards card with a commonly shared control plane for managing data packet forwarding operations in the bare-metal networking device; and
  communicate, among the front-end line cards and the backplane using the commonly shared control plane, over Ethernet and perform data packet forwarding in accordance with standardized networking protocols.

11. The one or more hardware-based non-transitory computer-readable memory devices of claim 10, in which each ASIC respectively associated with the front-end line cards and backplane communicate with each other using layer 2 or layer 3 networking protocols within an OSI (Open Systems Interconnection) model.

12. The one or more hardware-based non-transitory computer-readable memory devices of claim 11, in which the ASICs communicate over Ethernet protocols.

13. The one or more hardware-based non-transitory computer-readable memory devices of claim 12, in which the ASICs communicate using at least logical link control (LLC) or media access control (MAC) addressing.

14. A method performed by a bare-metal networking device that operates within a chassis and has components which utilize standardized networking protocols for communicating with other components within the bare-metal networking device, comprising:
  operating application-specific integrated circuits (ASICs) on front-end line cards and on a backplane within the bare-metal networking device,
  utilizing an instance of an open source operating system that is distributed among each front-end line card and on the backplane operating within the bare-metal networking device chassis, wherein the distributed open source operating system enables disaggregation between software and hardware on the front-end line cards and the backplane,
    wherein the instances of the open source operating system are utilized in place of a proprietary operating system that is configured to connect the front-end line cards and the backplane,
    wherein the open source operating system is SONiC (Software for Open Networking in the Cloud),
    wherein the open source operating system supports one or more network and management applications which are configured to provide each respective ASIC on the front end line cards card with a commonly shared control plane for managing data packet forwarding operations in the bare-metal networking device; and
  communicating, among the front-end line cards and the backplane using the commonly shared control plane, over Ethernet and perform data packet forwarding in accordance with standardized networking protocols.

15. The method of claim 14, in which the SONiC open source operating system hosts a routing table which is utilized by the ASICs to route incoming data packets.

16. The method of claim 14, in which the SONiC open source operating system hosts BGP (border gateway protocol) for packet forwarding.

17. The method of claim 14 in which the one or more network and management applications provide packet routing capabilities to the front-end line cards.

18. The method of claim 17 in which an ASIC on a front-end line card consults with the one or more network and management applications to obtain routing information for data packets that are incoming to the front-end line card.

* * * * *